US009840956B2

(12) United States Patent
Patel (10) Patent No.: US 9,840,956 B2
(45) Date of Patent: Dec. 12, 2017

(54) SELECTIVE CATALYTIC REDUCTION WARMUP SYSTEM

(71) Applicant: International Engine Intellectual Property Company, LLC, Lisle, IL (US)

(72) Inventor: Rajesh T. Patel, Lombard, IL (US)

(73) Assignee: International Engine Intellectual Property Company, LLC., Lisle, IL (US)

(*) Notice: Subject to any disclaimer, the term of this patent is extended or adjusted under 35 U.S.C. 154(b) by 0 days.

(21) Appl. No.: 14/537,741

(22) Filed: Nov. 10, 2014

(65) Prior Publication Data
US 2016/0130999 A1  May 12, 2016

(51) Int. Cl.
*F01N 3/20* (2006.01)
*F01N 9/00* (2006.01)
*F01N 13/18* (2010.01)
*F01N 13/00* (2010.01)

(52) U.S. Cl.
CPC ........ *F01N 3/2006* (2013.01); *F01N 3/2066* (2013.01); *F01N 9/00* (2013.01); *F01N 13/009* (2014.06); *F01N 13/1805* (2013.01); *F01N 2240/02* (2013.01); *F01N 2410/06* (2013.01); *F01N 2900/1602* (2013.01); *Y02T 10/24* (2013.01); *Y02T 10/26* (2013.01); *Y02T 10/47* (2013.01)

(58) Field of Classification Search
CPC ...... F01N 3/2006; F01N 3/2066; F01N 13/04; F01N 3/0211; F01N 1/02; F01N 3/00; B60K 13/04
See application file for complete search history.

(56) References Cited

U.S. PATENT DOCUMENTS

| | | | | |
|---|---|---|---|---|
| 4,625,511 A * | 12/1986 | Scheitlin | ............... | F01N 3/0211 422/168 |
| 5,009,065 A * | 4/1991 | Howe | ....................... | F01N 1/02 55/314 |
| 5,212,948 A * | 5/1993 | Gillingham | ............... | F01N 1/02 55/314 |
| 5,787,706 A * | 8/1998 | Smedler | ............. | B01D 53/9481 60/288 |
| 7,980,068 B2 * | 7/2011 | Rinaldi | ................ | F01N 3/0211 60/295 |
| 7,981,176 B2 * | 7/2011 | Rinaldi | ............. | B01D 46/0001 55/322 |
| 8,327,629 B2 * | 12/2012 | Masuda | ................ | B01D 46/24 60/296 |

(Continued)

*Primary Examiner* — Hau V Phan
(74) *Attorney, Agent, or Firm* — Jack D. Nimz; Jeffrey P. Calfa (57) ABSTRACT

An engine and after treatment system comprising an engine with an exhaust line engaged to upstream after treatment components, the upstream after treatment components engaged to a selective catalytic reduction converter, a means for bypassing the upstream after treatment components to allow engine exhausts to warm a catalyst within the selective catalytic reduction converter. One version allows indirect warming of the catalyst by providing a pathway for engine exhausts thru a warming cavity located on an outer region of the selective catalytic converter and then back thru the upstream after treatment components.

2 Claims, 7 Drawing Sheets

(56) References Cited

U.S. PATENT DOCUMENTS

| | | | |
|---|---|---|---|
| 2010/0050598 A1* | 3/2010 | Plati | B01D 53/9454 60/274 |
| 2011/0302910 A1* | 12/2011 | Burgers | F01N 3/2889 60/299 |
| 2011/0308234 A1* | 12/2011 | De Rudder | B01F 3/04049 60/295 |
| 2013/0276438 A1* | 10/2013 | De Rudder | F01N 3/00 60/324 |

* cited by examiner

SELECTIVE CATALYTIC REDUCTION WARMUP SYSTEM

BACKGROUND

This disclosure relates to internal combustion engines and selective catalytic reduction (SCR) after-treatment systems for such engines. SCR systems are for reducing NOx that are generated in internal combustion engines.

The SCR systems involve the chemical reduction of NOx in the presence of a catalyst. SCR catalysts are manufactured from various ceramic materials used as a carrier, such as titanium oxide, and active catalytic components may be oxides of base metals (such as vanadium, molybdenum and tungsten), zeolites, or various precious metals. The catalyst operates more efficiently at temperatures much warmer than ambient. Systems warm up through passing exhaust gases from an engine thru upstream after-treatment components such as diesel oxidation catalyst (DOC) and diesel particulate filter (DPF), although there is heat loss as the exhaust passes thru upstream components delaying the warm up of the SCR catalyst and hence delaying efficient reduction of NOx.

One technique to allow for faster warm up of the SCR catalyst is to add insulation to the selective catalytic reduction (SCR) converter or container to reduce heat loss.

SUMMARY

This present disclosure involves using the exhaust gases directly out of the engine to warm the selective catalytic reduction (SCR) catalyst without heat losses associated with passing thru components upstream of the SCR catalyst.

The disclosure involves an engine and after treatment system comprising an engine with an exhaust line engaged to upstream after treatment components, the upstream after treatment components engaged to a selective catalytic reduction converter, and a means for bypassing the upstream after treatment components to allow engine exhausts to warm a catalyst within the selective catalytic reduction converter. The warming may be direct by passing the bypassed engine exhaust gases directly through the catalyst or indirect in that the exhaust gases may be bypassed to a warming cavity in thermal conduction with the portion of the selective catalytic reduction converter that contains the catalyst. In the indirect warming embodiment, the means for bypassing the upstream after treatment components allows indirect warming of the catalyst by providing a pathway for engine exhausts thru a warming cavity on an outer region of the selective catalytic converter and then back thru the upstream after treatment components.

Engines with selective catalytic reduction (SCR) catalyst for reducing NOx may be configured on motor vehicles or as fixed systems for power generation. In the vehicle configurations, the vehicle may have a chassis, which may be structured with two parallel frame rails. A vehicle cab for a driver will be attached to or incorporated into the chassis. Front and rear axles are engaged to the chassis and have wheels engaged at their ends. An engine is engaged to the chassis for driving an axle through a transmission and drive shaft.

Exhaust from the engine flows thru components upstream of the SCR catalyst and on to the SCR catalyst. Diesel exhaust fluid (DEF) flows from the DEF tank to the diesel exhaust fluid injection line which enters the stream between the components upstream of the SCR catalyst and the SCR converter that contains SCR catalyst. The components upstream of the SCR catalyst may be a diesel oxidation catalyst (DOC) and diesel particulate filter (DPF), some combination of these or other components in which the exhaust stream would lose thermal energy.

One configuration for this disclosure has an engine with an exhaust line leading to components upstream of the SCR converter and then on to the SCR converter and then exhaust line to atmosphere. There is an engine exhaust stop valve in the line between the engine and the components upstream of the SCR converter. The SCR converter contains the SCR catalyst within an inner wall of outer warming shell of the SCR converter. An outer wall of outer warming shell is spaced outwards of the inner wall of outer warming to form a warming cavity. A bypass line upstream of the engine exhaust stop valve allows a flow path directly from the engine to a connection line to downstream side of the warming cavity of the SCR converter. A connection line from an upstream side of the warming cavity allows a flow path directly from the warming cavity to downstream of the engine exhaust stop valve. An electronic control module controls the engine exhaust stop valve. When the electronic control module closes the engine exhaust stop valve, engine exhausts will be fully directed to the warming cavity providing warming of the SCR catalyst. The connection line from the upstream side of the warming cavity allows a flow path from the warming cavity to downstream of the engine exhaust stop valve and then thru the components upstream of the SCR converter, and the SCR catalyst, and then exhaust out. The components upstream of the SCR converter may be a diesel oxidation catalyst or a diesel particulate filter or some combination of these components.

In one simple alternative configuration for this disclosure, there is no exhaust stop valve and the system funnels all engine exhausts from the engine to a connection line to downstream side of the warming cavity of the SCR converter. A connection line from an upstream side of the warming cavity allows a flow path directly from the warming cavity to the inlet of the diesel oxidation catalyst or a diesel particulate filter or some combination of these components, and then on to the SCR converter and then to the exhaust line to atmosphere.

Another alternative configuration for this disclosure also has an engine with an exhaust line leading to components upstream of the SCR converter and then on to the SCR converter and then exhaust line to atmosphere. There are two three way valves in the line between the engine and the components upstream of the SCR converter. One of the three way valves, an upstream three way valve for cross flow warming is engaged to a bypass line and allows a flow path directly from the engine to a connection line to downstream side of warming cavity of the SCR converter. A connection line from an upstream side warming cavity allows a flow path directly from the warming cavity to a second three way valve, a downstream three way valve for cross flow warming, which is downstream of the upstream three way valve for cross flow warming and upstream of the components upstream of the SCR converter. An electronic control module controls the upstream three way valve for cross flow warming and the downstream three way valve for cross flow warming. When the electronic control module repositions the upstream three way valve for cross flow warming and the downstream three way valve for cross flow warming to close or throttle a pathway from the engine to the components upstream of the SCR converter, engine exhausts will be directed to a downstream side of the warming cavity providing warming of the SCR catalyst. The connection line from an upstream side of the warming cavity to the downstream three way valve for cross flow warming allows a flow path from the warming cavity to the components upstream of the SCR converter, and the SCR catalyst, and then exhaust out.

A third embodiment for this disclosure also has an engine with an exhaust line leading to components upstream of the SCR converter and then on to the SCR catalyst in the SCR converter and then exhaust line to atmosphere. There are two three way valves in the line between the engine and the components upstream of the SCR converter. One of the three way valves, an upstream three way valve for parallel flow warming is engaged to a bypass line and allows a flow path directly from the engine to a connection line to upstream side of warming cavity of the SCR converter. A connection line from a downstream side warming cavity area allows a flow path from the warming cavity to a second three way valve, a downstream three way valve for parallel flow warming, which is downstream of the upstream three way valve for parallel flow warming and upstream of the components upstream of the SCR converter. An electronic control module controls the upstream three way valve for parallel flow warming and the downstream three way valve for parallel flow warming. When the electronic control module repositions the upstream three way valve for parallel flow warming and the downstream three way valve for parallel flow warming to close a pathway from the engine to the components upstream of the SCR converter, engine exhausts will be directed to an upstream side of the warming cavity providing warming of the SCR catalyst. The connection line from a downstream side of the warming cavity to the downstream three way valve for parallel flow warming allows a flow path from the warming cavity to the components upstream of the SCR converter, and the SCR catalyst, and then exhaust out.

A fourth embodiment for this disclosure also has an engine with an exhaust line leading to components upstream of the SCR converter and then on to the SCR catalyst in the SCR converter and then exhaust line to atmosphere. In this situation the SCR converter does not have a warming cavity. Engine exhausts may be redirected around the components upstream of the SCR converter to pass directly into contact with the SCR catalyst to warm the SCR catalyst. There is an upstream three way bypass valve between the engine and components upstream of the SCR converter, and there is a downstream three way bypass valve between the components upstream of the SCR converter and the SCR converter. The upstream three way bypass valve and the downstream three way bypass valve are connected by a bypass line which allows exhausts from the engine to bypass the components upstream of the SCR converter and lead directly to the SCR catalyst in the SCR converter to warm the SCR catalyst, when an electronic control module directs the upstream three way bypass valve and the downstream three way bypass valve to reposition for warm-up bypass operation.

One embodiment of a selective catalytic reduction converter has the SCR catalyst contained within an elliptical or cylindrically shaped container. The SCR catalyst is within an inner wall of a the elliptical or cylindrically shaped container such that exhausts from the components upstream are directed to one end, a first end, of the container passing through the SCR catalyst and then exiting through the other end or second end of the SCR container. In such a configuration, an outer wall is spaced radially outwards of the inner wall of the elliptical or cylindrically shaped container to form a warming cavity. In this version of the SCR converter, there is a connection line from a downstream side of the warming cavity, and there is a connection line from the upstream side of the warming cavity. Engine exhaust gases may be directed from to one of these to allow exhaust gas flow direction within the warming cavity to provide warming to the SCR catalyst within. The elliptical or cylindrical shape of the warming cavity allows for efficient exhaust gas warming flow.

The foregoing summary, accompanied by further detail of the disclosure, will be presented in the Detailed Description below with reference to the following drawings that are part of this disclosure.

DETAILED DESCRIPTION

Figure 1:
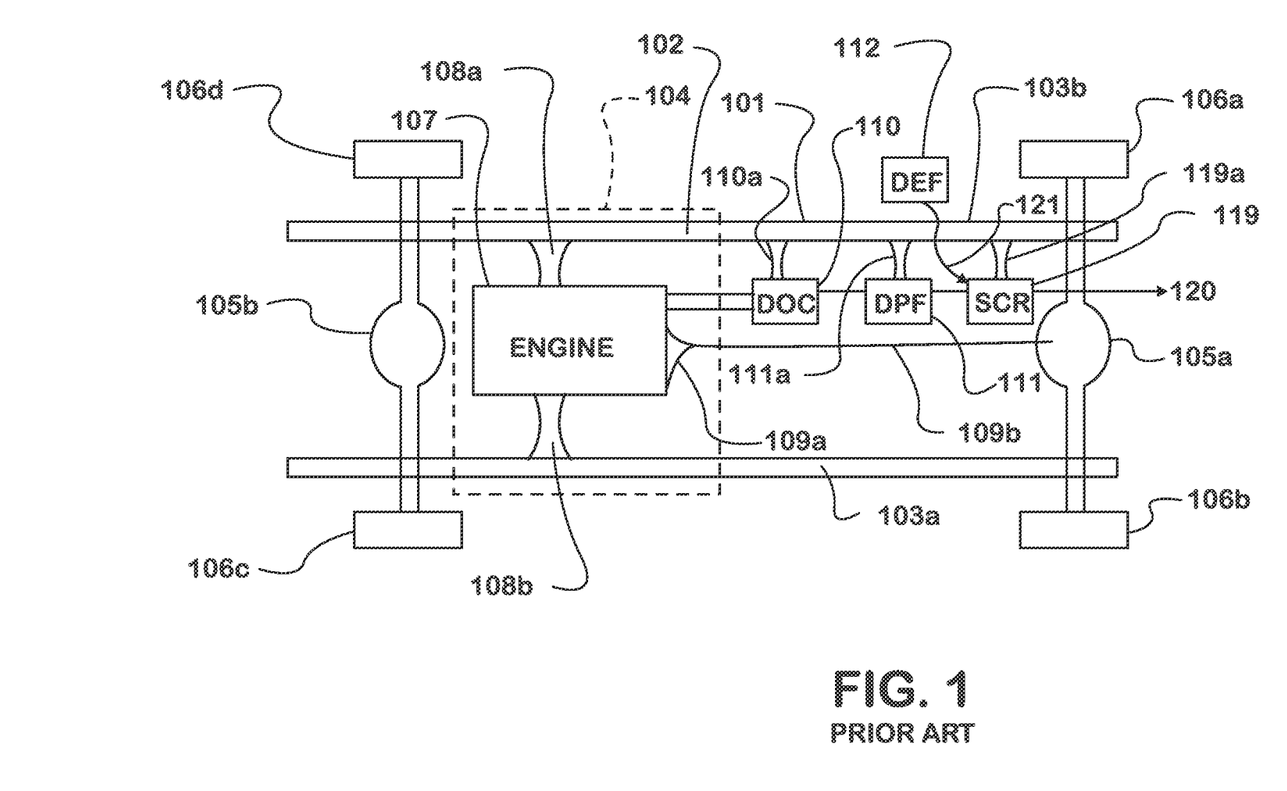
FIG. 1 is a diagram of a motor vehicle with an engine and a selective catalytic reduction catalyst in the exhaust system.

FIG. 1 shows a motor vehicle 101. The motor vehicle 101 has a chassis 102, which is structured with two parallel frame rails 103a and 103b. A vehicle cab 102 for a vehicle driver will be attached to or incorporated into the chassis 102. A front axle 105b and a rear axle 105a are engaged to the chassis 102 and have wheels 106a, 106b, 106c, and 106d engaged at opposite ends of the front axle 105b and a rear axle 105a respectively. An engine 107 is engaged to the chassis 102 through engine supports 108a and 108b. The engine 107 is for driving the rear axle 105a through a transmission 109a and drive shaft 109b.

Exhaust from the engine 108 flows thru components upstream of a selective catalytic reduction (SCR) converter 119. The components upstream of the SCR catalyst may be a diesel oxidation catalyst (DOC) 110 and diesel particulate filter (DPF) 111, or some combination of these or other components in which the exhaust stream would lose thermal energy. The DOC 110 is mechanically engaged to the chassis 102 through a diesel oxidation catalyst support bracket 110a. The DPF 111 is engaged to the chassis 102 through a diesel particulate filter support bracket 111a. The SCR converter 119 contains an SCR catalyst 156 and is engaged to the chassis 102 through a selective catalytic reduction converter support bracket 119a. Diesel exhaust fluid (DEF) flows from a DEF tank 112, which is engaged to the chassis 102, to a diesel exhaust fluid injection line 121 which enters the stream between the DOC 110 and the DPF 111, and the SCR converter 119 that contains SCR catalyst 156.

Figure 2:
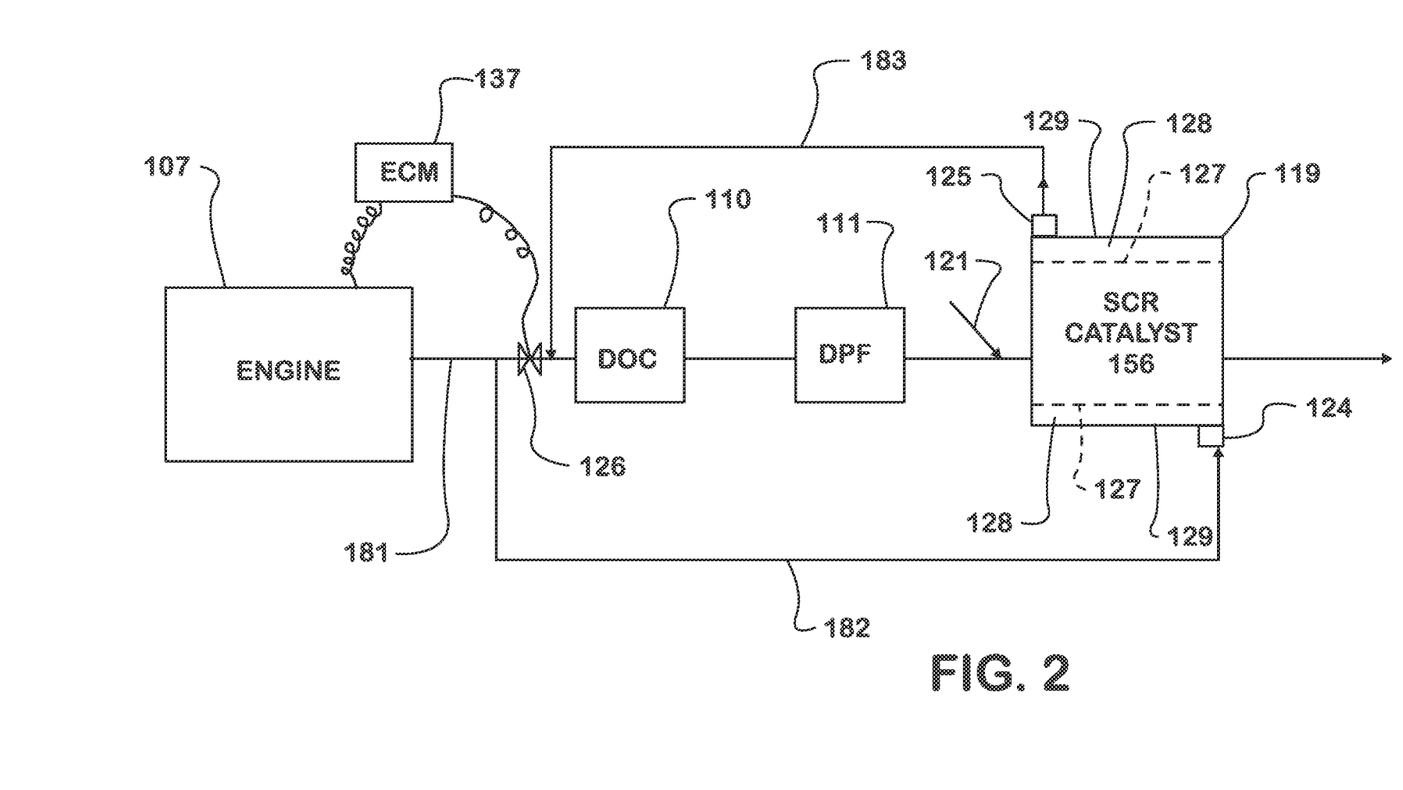
FIG. 2 is a first embodiment of the disclosure of an engine and after treatment with a selective catalytic reduction warm up system.

FIG. 2 shows an embodiment of the disclosure of an engine 107 and after treatment with a selective catalytic reduction warm up system which may be used in the vehicle 101 or in a stand-alone electric power configuration. There is an engine exhaust stop valve 126 in the engine to after treatment line 181 between the engine 107 and the components upstream of the SCR converter 119. The SCR converter 119 contains the SCR catalyst 156 within an inner wall of outer warming shell 127 of the SCR converter 119. An outer wall of outer warming shell 129 is spaced outwards of the inner wall of outer warming 127 to form a warming cavity 128. A supply bypass line 182 upstream of the engine exhaust stop valve 126 allows a flow path directly from the engine 107 to a connection line to downstream side of the warming cavity 124 of the SCR converter 119. A connection line from an upstream side of the warming cavity 125 allows a flow path directly from the warming cavity 128 to downstream of the engine exhaust stop valve 126 through a return bypass line 183. An electronic control module 137 controls the engine exhaust stop valve 126. When the electronic control module 137 closes the engine exhaust stop valve 126, engine exhausts will be fully directed to the warming cavity 128 providing warming of the SCR catalyst 156. The connection line from the upstream side of the warming cavity 125 allows a flow path from the warming cavity to downstream of the engine exhaust stop valve 126 and then thru the components upstream of the SCR converter 119, and the SCR catalyst 156, and then exhaust out 120. The components upstream of the SCR catalyst 156 may be a diesel oxidation catalyst (DOC) 110 and diesel particulate filter (DPF) 111, or some combination of these or other components in which the exhaust stream could lose thermal energy while passing thru.

Figure 3:
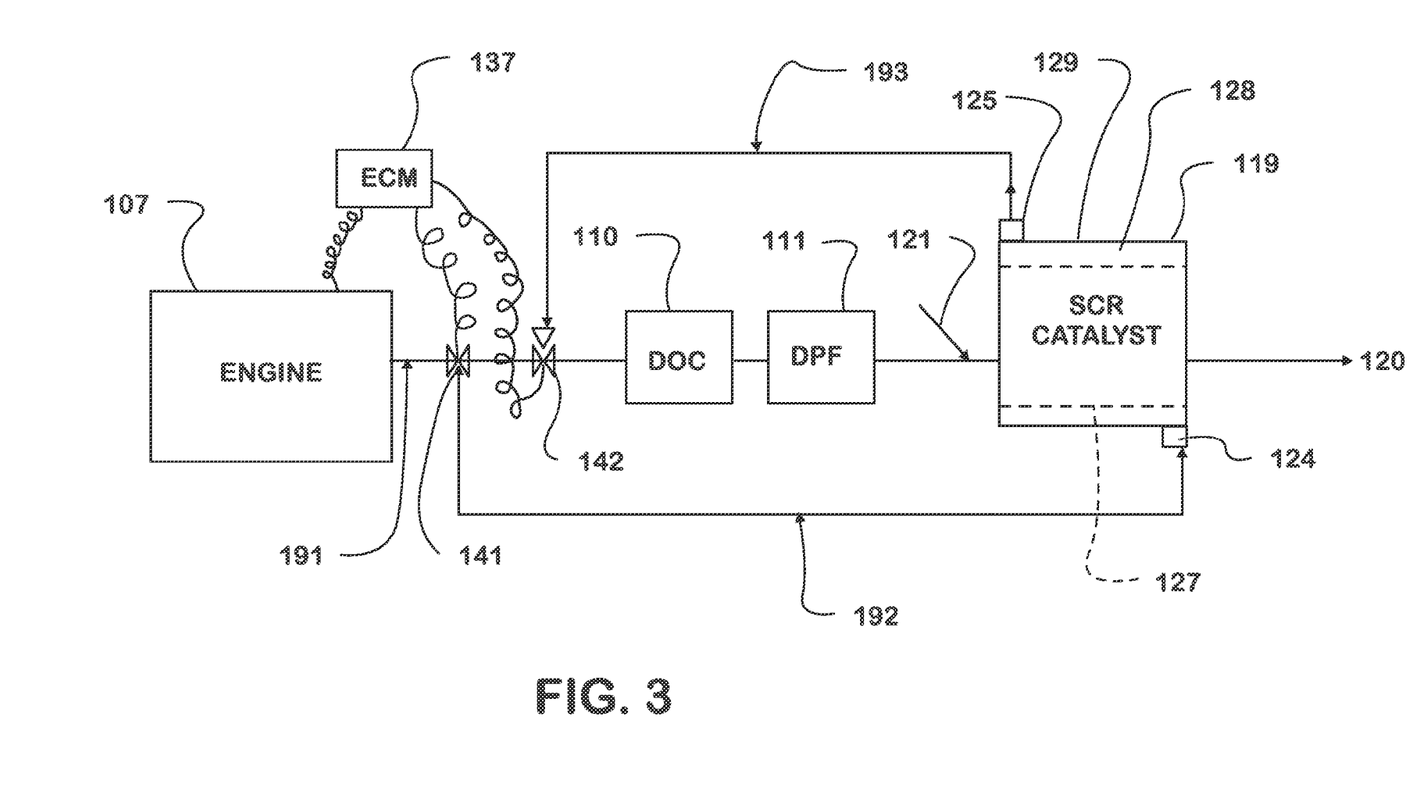
FIG. 3 is a second embodiment of the disclosure of an engine and after treatment with a selective catalytic reduction warm up system.

FIG. 3 shows second embodiment configuration for this disclosure involving cross flow warming on the SCR converter 119, which may be used in the vehicle 101 or in a stand-alone electric power configuration. In cross flow warming the axial direction of warming flow will be the reverse of the exhaust flow thru the SCR catalyst 156. The engine exhaust enters the warming cavity 128 on the same side as the exhausts leave the SCR catalyst 156 within the SCR converter 119, and once heating has been provided the exhaust leaves the warming cavity 128 on the same side as upstream exhausts enter the SCR catalyst 156. There are two three way valves in the engine to after treatment line 191 between the engine 107 and the components upstream of the SCR converter 119. One of the three way valves, an upstream three way valve for cross flow warming 141 is engaged to a supply bypass line 192 and allows a flow path directly from the engine 107 to a connection line to downstream side of warming cavity 124 of the SCR converter 119. A connection line from an upstream side warming cavity 125 allows a flow path directly from the warming cavity 128 thru a return bypass line 193 to a second three way valve, a downstream three way valve for cross flow warming 142, which is downstream of the upstream three way valve for cross flow warming 141 and upstream of the components upstream of the SCR converter 119. An electronic control module 137 controls the upstream three way valve for cross flow warming 141 and the downstream three way valve for cross flow warming 142. When the electronic control module 137 repositions the upstream three way valve for cross flow warming 141 and the downstream three way valve for cross flow warming 142 to close or throttle a pathway from the engine 119 to the components upstream of the SCR converter 119, engine exhausts will be directed to a downstream side of the warming cavity 124 providing warming of the SCR catalyst 156. The connection line from an upstream side of the warming cavity 125 to the downstream three way valve for cross flow warming 142 allows a flow path from the warming cavity 128 to the components upstream of the SCR converter 119, and the SCR catalyst 156, and then exhaust out.

Figure 4:
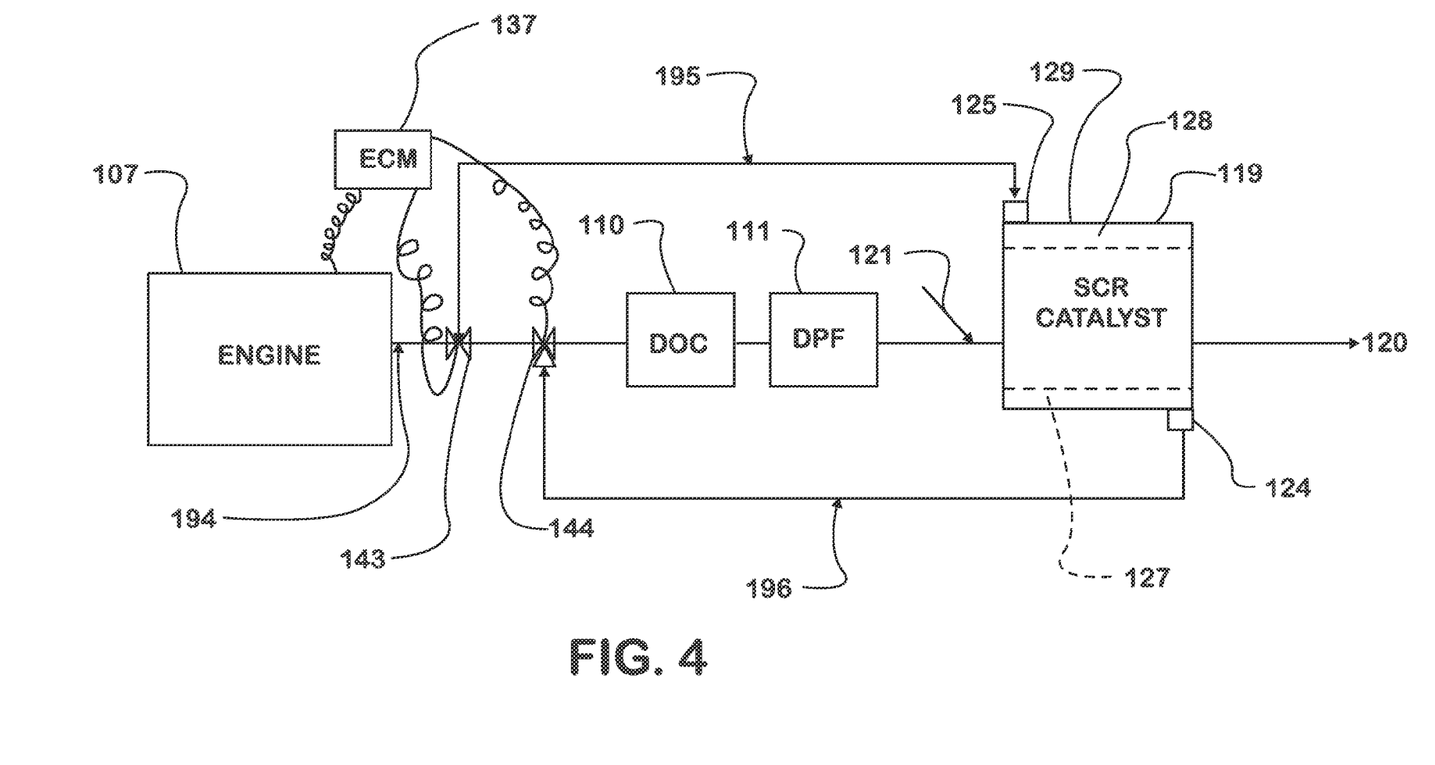
FIG. 4 is a third embodiment of the disclosure of an engine and after treatment with a selective catalytic reduction warm up system.

FIG. 4 shows a third embodiment for this disclosure involving parallel flow warming on the SCR converter 119, which may be used in the vehicle 101 or in a stand-alone electric power configuration. In parallel flow warming the axial direction of warming flow will be the same direction of the exhaust flow thru the SCR catalyst 156. The engine exhaust enters the warming cavity 128 on the same side as the exhausts enter the SCR catalyst 156 within the SCR converter 119, and once heating has been provided the exhaust leaves the warming cavity 128 on the same side as upstream exhausts leave the SCR catalyst 156. There are two three way valves in an engine to after treatment line 194 between the engine 107 and the components upstream of the SCR converter 119. One of the three way valves, an upstream three way valve for parallel flow warming 143 is engaged to a supply bypass line 195 and allows a flow path directly from the engine 107 to a connection line to upstream side of warming cavity 125 of the SCR converter 119. A connection line from a downstream side warming cavity 124 allows a flow path from the warming cavity 128 thru a return bypass line 196 to a second three way valve, a downstream three way valve for parallel flow warming 144, which is downstream of the upstream three way valve for parallel flow warming 143 and upstream of the components upstream of the SCR converter 119. An electronic control module 137 controls the upstream three way valve for parallel flow warming 143 and the downstream three way valve for parallel flow warming 144. When the electronic control module 137 repositions the upstream three way valve for parallel flow warming 143 and the downstream three way valve for parallel flow warming 144 to close or throttle a pathway from the engine 107 to the components upstream of the SCR converter 119, engine exhausts will be directed to an upstream side of the warming cavity 128 providing warming of the SCR catalyst 156. The return bypass line 196 from a downstream side of the warming cavity 124 to the downstream three way valve for parallel flow warming 144 allows a flow path from the warming cavity 128 to the components upstream of the SCR converter 119, and thru the SCR catalyst 156, and then exhaust out 120.

Figure 5:
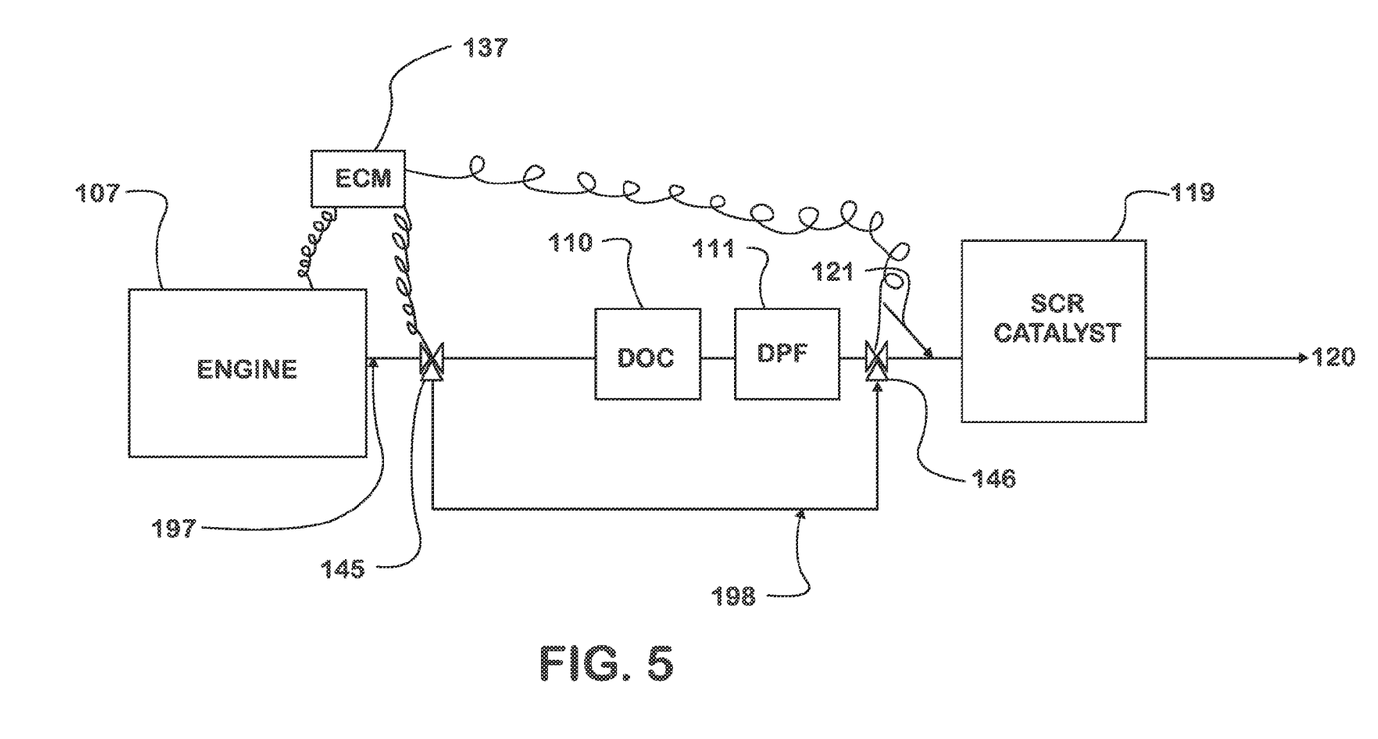
FIG. 5 is a fourth embodiment of the disclosure of an engine and after treatment with a selective catalytic reduction warm up system.

FIG. 5 shows a fourth embodiment of the disclosure, which may be used in the vehicle 101 or in a stand-alone electric power configuration. Engine exhausts may be redirected around the components upstream of the SCR converter 119 to pass directly into contact with the SCR catalyst 156 to warm the SCR catalyst 156. There is an upstream three way bypass valve 145 in the engine to after treatment line 197 between the engine 107 and components upstream of the SCR converter 119, and there is a downstream three way bypass valve 146 between the components upstream of the SCR converter 119 and the SCR converter 119. The upstream three way bypass valve 145 and the downstream three way bypass valve 146 are connected by a upstream after treatment bypass line 198 which allows exhausts from the engine 107 to bypass the components upstream of the SCR converter 119 and lead directly to the SCR catalyst 156 in the SCR converter 119 to warm the SCR catalyst 156, when an electronic control module 137 directs the upstream three way bypass valve 145 and the downstream three way bypass valve 146 to reposition for warm-up bypass operation.

Figures 6, 6A:
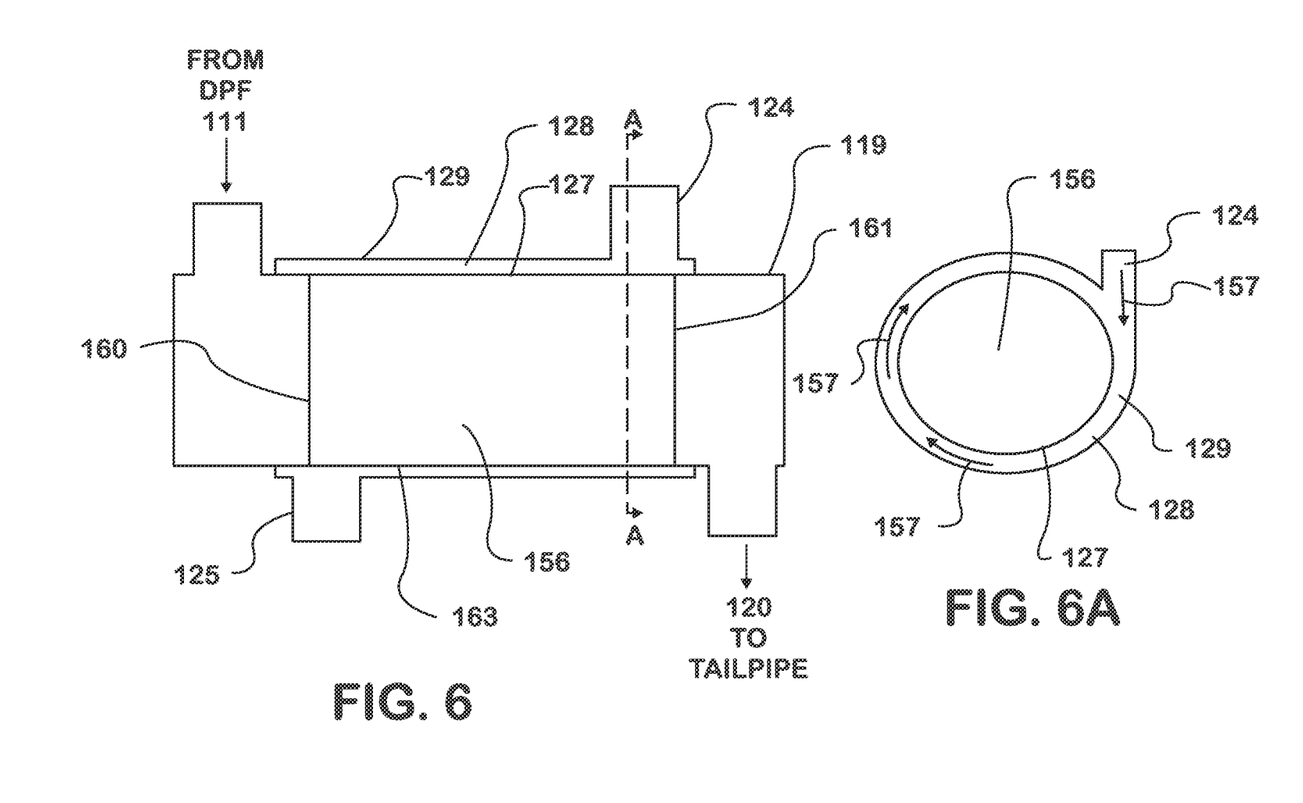
FIG. 6 is a selective catalytic reduction converter that may be used in the embodiments of FIGS. 2, 3, and 4.
FIG. 6A is a view of the cross section A-A of FIG. 6.

The versions of the electronic control module 137 described previously will involve some programming related to the need for warm-up, whether it be an actual thermal reading or logic tied to engine 107 startup FIGS. 6 and 6A show a selective catalytic reduction (SCR) converter 119 has the selective catalytic reduction (SCR) catalyst 156 contained within an elliptical or cylindrically shaped container. The SCR catalyst 156 is within an inner wall 127 of a the elliptical or cylindrically shaped catalyst container 163 such that exhausts from the components upstream are directed to one end, a first end of the catalyst container 160 passing through the SCR catalyst 156 and then exiting through the other end or second end of the catalyst container 161. In such a configuration, an outer wall 129 is spaced radially outwards of the inner wall 127 of the elliptical or cylindrically shaped container 163 to form a warming cavity 128. In this version of the SCR converter 119, there is a connection line from a downstream side of the warming cavity 124, and there is a connection line from the upstream side of the warming cavity 125. Engine exhaust gases may be directed from to one of these to allow exhaust gas flow direction 157 within the warming cavity 128 to provide warming to the SCR catalyst 156 within. The elliptical or cylindrical shape of the warming cavity 128 allows for efficient exhaust gas warming flow. The warming cavity may alleviate the need for external insulation on the SCR converter as the air gap in the warming cavity or warming flow thru the warming cavity may provide insulation or warming.

Figure 7:
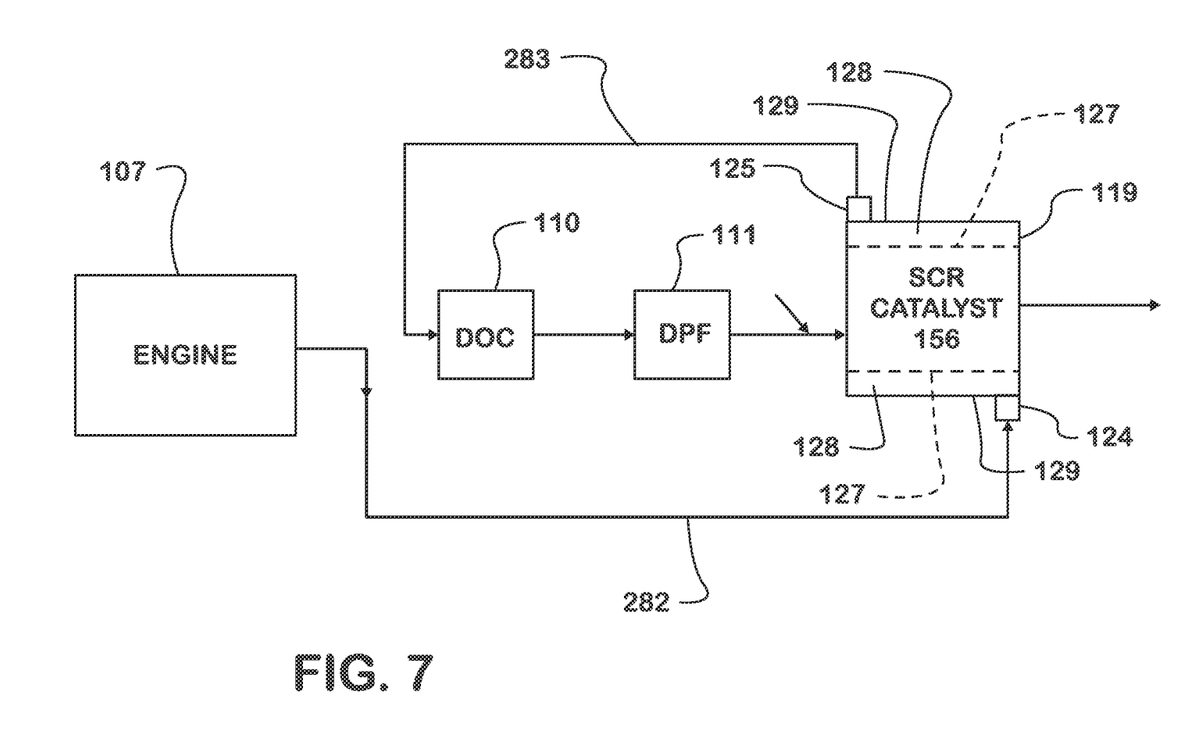
FIG. 7 is a fifth embodiment of the disclosure of an engine and after treatment with a selective catalytic reduction warm up system.

FIG. 7 is a fifth embodiment similar to the embodiment shown in FIG. 2 above, however simplified in that there is no engine exhaust stop valve. Instead all engine exhausts are funneled or channeled to the warming cavity 128 of the SCR converter 119. Exhausts from the engine 107 lead to a warming cavity supply line 282 allowing a flow path directly from the engine 107 to a connection line to downstream side of the warming cavity 124 of the SCR converter 119. A connection line from an upstream side of the warming cavity 125 allows a flow path directly from the warming cavity 128 to the inlet of the diesel oxidation catalyst (DOC) 110 through a warming cavity return line 283. The exhausts then pass thru the DOC 110 and then on to diesel particulate filter (DPF) 111, and the SCR catalyst 156, and then exhaust out 120.

As described above, the vehicle and selective catalytic reduction warm up system of this disclosure provide a number of advantages, some of which have been described above and others of which are inherent in the disclosure. Also modifications may be proposed to the vehicle and selective catalytic reduction warm up system of this disclosure without departing from the teachings herein.

What is claimed is:

1. A selective catalytic reduction converter, comprising:
a selective catalytic reduction catalyst;
the catalyst being within a container such that there is a pathway for exhausts directed to a first end of the container to pass through the catalyst and then exit through a second end of the container;
the catalyst being within an inner wall of the container;
an outer wall spaced radially outwards of the inner wall of the container to form a warming cavity;
a connection line from a downstream side engaged to the warming cavity;
a connection line from an upstream side engaged to the warming cavity on a side opposite of the connection line from a downstream side; and
a flow path between the connection line from the upstream side and the connection line from the downstream side such that a gas is directed through the warming cavity, allowing the gas to provide warming to the catalyst within the container.

2. The selective catalytic reduction converter as set forth in claim 1, wherein the container is cylindrically shaped container such that exhausts from the components upstream are directed to a first end of the container passing through the catalyst and then exiting through a second end of the SCR container.

* * * * *